United States Patent Office 3,647,637
Patented Mar. 7, 1972

3,647,637
DISTILLATION OF STYRENE WITH ADDITION OF POLYMERIZATION INHIBITOR
Robert H. Rosenwald, Western Springs, Ill., assignor to Universal Oil Products Company, Des Plaines, Ill.
No Drawing. Filed Aug. 27, 1970, Ser. No. 67,613
Int. Cl. B01d 3/34
U.S. Cl. 203—9                                   5 Claims

ABSTRACT OF THE DISCLOSURE

Stabilizing styrene during distillation thereof by effecting the distillation in contact with a dehydrogenation catalyst.

BACKGROUND OF THE INVENTION

Undesired polymerization of styrene occurs during the distillation thereof. Various proposals have been made heretofore to reduce the undesired polymerization, including the utilization of polymerization inhibitors, such as molten sulfur, tertiarybutyl catechol, nitro compounds, etc. While these inhibitors help to reduce polymerization of the styrene during distillation thereof, it still is desired to further minimize such polymerization.

It recently has been proposed that polymerization of styrene during distillation is initiated by mono-radicals which are believed to proceed in accordance with the following equations:

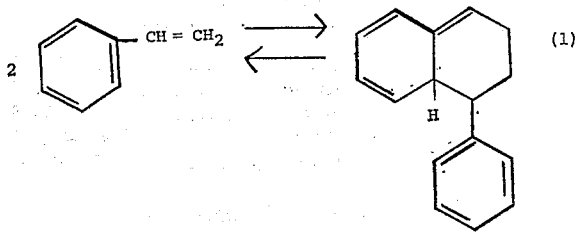

(1)

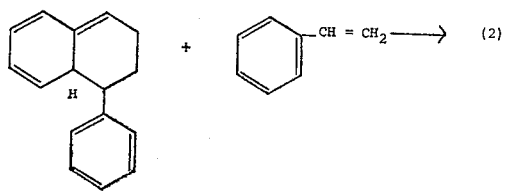

(2)

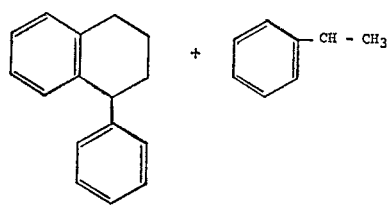

DESCRIPTION OF THE INVENTION

In order to convert these polymerization initiators, it now is proposed that the distillation be effected in contact with a dehydrogenation catalyst.

The crude styrene feed is separated from unreacted ethylbenzene and other products formed during the manufacture thereof, and the crude styrene feed then is subjected to final distillation to recover styrene of desired purity. The styrene is withdrawn as an overhead fraction and residual higher boiling products are withdrawn as bottoms from the distillation column. The higher boiling products comprise tars, polymers, sulfur inhibitor, if any, etc. The final distillation of styrene generally is effected at a temperature of from about 100° to about 250° F. at a subatmospheric pressure of from about 10 to about 200 mm. Hg absolute.

As hereinbefore set forth, during final distillation of the styrene, additional polymerization occurs and this undesired polymerization is further reduced in accordance with the present invention by effecting the distillation in the presence of a dehydrogenation catalyst. Any suitable dehydrogenation catalyst may be used and generally will comprise a metal or a compound thereof selected from Groups VIII, VI and I of the Periodic Table. Preferred catalysts comprise palladium and platinum. Other catalysts may comprise one or more of chromium, molybdenum, tungsten, iron, cobalt, nickel, ruthenium, rhodium, osmium, uridium, copper, silver, and gold, in the form of the free metal or compound thereof such as the oxide, sulfide or salts thereof. In another embodiment the catalyst also may contain an alkali or alkaline earth metal component, either as the metal or a compound thereof and particularly the oxide and/or sulfide, including the metal or compound of lithium, sodium, potassium, rubidium, cesium, beryllium, magnesium, calcium, strontium, barium, etc. While these catalysts may be used in unsupported form, generally as powder or in other finely divided condition, the catalyst preferably is supported or carried on a suitable support as, for example, alumina, silica, zirconia, magnesia, thoria, hafnia, titania, boria, carbon, etc. Such dehydrogenation catalysts are known in the art and may be prepared by separate or coprecipitation methods and then formed into the particles of uniform or irregular size and shape by grinding, pelleting, extrusion or in the various oil drop or spray dried methods. Preferred catalysts comprise palladium or platinum preferably composited with alumina, etc. The palladium or platinum may comprise from about 2% to about 25% and preferably from about 3% to about 10% by weight of the composite. In another embodiment, a preferred catalyst is a metal sulfide especially when sulfur is used as a polymerization inhibitor.

The catalyst may be supplied to the distillation zone in any suitable manner. In a preferred method the catalyst is disposed as a fixed bed in the distillation zone and arranged so that the products undergoing distillation contact the catalyst. The distillation column also may contain suitable vapor-liquid contact devices, such as bubble cap trays, preforated trays, valve trays, etc. The bed of dehydrogenation catalyst serves as additional contacting means and thus may reduce the number of contact trays which are required as compared to the number conventionally used in such columns.

As hereinbefore set forth, the intermediate compounds which give rise to chain initiators are converted upon contact with the dehydrogenation catalyst during the distillation and thus the propagation of undesired polymerization is halted. Accordingly, not only will the overhead product be of high purity styrene, comprising at least 39% by weight, but the yield will be increased due to the reduction in loss of styrene to polymers as encountered in prior art processes.

In another embodiment of the invention a hydrogen accepting compound is introduced into the styrene distillation column. Any suitable hydrogen accepting compound may be used but must be stable under the higher boiling than styrene in order not to distill overhead with and contaminate the styrene. Illustrative hydrogen accepting compounds include high boiling nitro compounds as, for example, nitrophenol, dinitrobenzene, etc. in which the nitro group is reduced to an amino group, high boiling aldehydes or ketone as, for example, heptaldehyde, benzaldehyde, stearone, phorone, benzophenone, etc. high boiling olefinic compounds as, for example, decene, undecene, dodecene, polyisobutylene, etc. The hydrogen acceptor will be used in a sufficient concentration to accomplish the purpose and may be within the range of from about 0.05% to about 10% by volume of the crude styrene feed.

The styrene distillation column may be of conventional design except for the added bed of dehydrogenation catalyst disposed in a mid-portion of the column. The column will be provided at the bottom with suitable heating means which, in one embodiment, may comprise an internal heat exchanger and, in another embodiment, may comprise passing a portion of the bottoms product through a suitable reboiler and then returning the heated bottoms product to the distillation column to provide the desired heat. The top of the column may be provided with an internal cooling coil but more generally will comprise an external condenser and receiver, from which a portion of the condensate is recycled to the upper portion of the column to serve as a reflux and condensing medium. As hereinbefore set forth, polymerization inhibitor, when employed, may be introduced into the column in any suitable manner, either being supplied to the crude styrene feed or added to the reflux being returned to the upper portion of the column.

The following example is introduced to illustrate further the novelty and utility of the present invention but not with the intention of unduly limiting the same.

EXAMPLE I

In this example, 607 moles per hour of a crude styrene feed is charged to a conventional distillation column at a temperature of about 230° F. The distillation column contains a fixed bed of 10% palladium on alumina dehydrogenation catalyst disposed in a mid-portion of the column. An overhead stream consisting of at least 99% by weight styrene is withdrawn from the upper portion of the distillation column at a temperature of about 140° F. and a pressure of about 40 mm. Hg absolute. The vapors are condensed at a temperature of about 125° F. and 30 mm. Hg and collected in a receiver, from which about 600 mols per hour are recycled to the upper portion of the distillation column to serve as cooling and refluxing medium therein. The remainder of the styrene collected in the receiver is withdrawn as product. The lower portion of the distillation column is heated by withdrawing the bottoms product and recirculating a portion thereof through a reboiler in order to maintain the bottom of the column at a temperature of about 210° F. The remainder of the bottoms product is withdrawn and disposed of as desired. It will be found that undesired polymerization of the styrene is reduced by effecting the distillation in contact with the dehydrogenation catalyst.

I claim as my invention:
1. A styrene purification method which comprises:
   (a) introducing impure styrene into a distillation zone;
   (b) effecting distillation of said impure styrene in said zone;
   (c) contacting the styrene within the distillation zone with a dehydrogenation catalyst selected from the metals and compounds of the metals of Groups I, VI and VIII of the Periodic Table in an amount sufficient to stabilize the styrene during the distillation; and,
   (d) recovering as overhead product from the distillation zone styrene of high purity and yield.

2. The method of claim 1 in which said distillation is conducted at a temperature of from about 100° to about 250° F. and at a reduced pressure of from about 10 to about 200 mm. Hg absolute.

3. The method of claim 1 in which said catalyst comprises alumina-palladium.

4. The method of claim 1 in which said catalyst comprises a metal or compound of a metal of Group VI of the Periodic Table.

5. The method of claim 1 in which said catalyst comprises a metal or compound of a metal of Group VIII of the Periodic Table.

References Cited
UNITED STATES PATENTS

| 3,222,263 | 12/1965 | Campbell | 203—9 |
| 3,366,457 | 1/1968 | Hunter | 203—Dig 6 |
| 3,408,265 | 10/1968 | Ward | 203—9 |
| 3,409,689 | 11/1968 | Ward | 260—669 R |
| 3,515,766 | 6/1970 | Root et al. | 260—669 R |

WILBUR L. BASCOMB, JR., Primary Examiner

U.S. Cl. X.R.

203—31; 260—669 R